(12) United States Patent
Peloquin et al.

(10) Patent No.: US 7,473,376 B2
(45) Date of Patent: Jan. 6, 2009

(54) APPARATUS FOR PRODUCTION, WITHDRAWAL AND TRANSFER OF HIGHLY VISCOUS SLURRY

(75) Inventors: Guy Peloquin, Jonquière (CA); Renald Dufour, Jonquière (CA); Andrew N. Carruthers, Beaconsfield (CA); Donald Puxley, Jonquière (CA)

(73) Assignee: Alcan International Limited, Montreal, Quebec (CA)

( * ) Notice: Subject to any disclaimer, the term of this patent is extended or adjusted under 35 U.S.C. 154(b) by 0 days.

(21) Appl. No.: 11/508,059

(22) Filed: Aug. 22, 2006

(65) Prior Publication Data

US 2007/0045202 A1 Mar. 1, 2007

Related U.S. Application Data

(60) Provisional application No. 60/710,455, filed on Aug. 23, 2005.

(51) Int. Cl.
*B01D 21/24* (2006.01)
(52) U.S. Cl. .................. 210/803; 210/523; 210/524; 210/527; 210/528
(58) Field of Classification Search .......... 210/523, 210/527, 534, 536, 541, 803, 524, 528; 198/662, 198/750.1
See application file for complete search history.

(56) References Cited

U.S. PATENT DOCUMENTS

| | | | | |
|---|---|---|---|---|
| 1,732,386 A | * | 10/1929 | Sprockhoff | 210/523 |
| 2,085,150 A | * | 6/1937 | Gemeny | 210/527 |
| 2,678,912 A | * | 5/1954 | Kalinske et al. | 210/523 |
| 3,628,667 A | * | 12/1971 | Somora et al. | 210/523 |
| 4,005,019 A | * | 1/1977 | Parlette | 210/527 |
| 4,364,831 A | * | 12/1982 | Burns et al. | 210/523 |
| 4,776,960 A | * | 10/1988 | Cerroni | 210/527 |
| 4,826,361 A | | 5/1989 | Merz | |
| 4,830,507 A | | 5/1989 | Bagatto et al. | |
| 5,080,803 A | | 1/1992 | Bagatto et al. | |
| 5,524,796 A | * | 6/1996 | Hyer | 198/662 |
| 5,910,243 A | * | 6/1999 | Bruke | 210/523 |

(Continued)

FOREIGN PATENT DOCUMENTS

EP 0 019 538 A1 11/1980

(Continued)

*Primary Examiner*—Christopher Upton
(74) *Attorney, Agent, or Firm*—RatnerPrestia

(57) ABSTRACT

Method and apparatus for separating components of slurries by gravity settling thereby forming a thickened slurry and a clarified liquid. The apparatus comprises a vessel for decanting a volume of slurry, the vessel having a top and an interior formed by a side wall and a bottom wall for holding the slurry, a slurry inlet means, an outlet for the clarified liquid near the top of the vessel, and a slurry withdrawal apparatus for removal of the thickened slurry from the vessel at or near the bottom wall thereof. The slurry withdrawal apparatus physically engages a portion of the slurry within the vessel interior and transports it through a vessel outlet. The apparatus may include an elongated, rotatable, open spiral-shaped element extending a distance into the vessel from outside near the bottom wall of the vessel, the open spiral-shaped element being in direct and open communication with the interior of the vessel over at least a significant portion of the distance, and a rotational drive mechanism for rotating the open spiral-shaped element, at least intermittently.

23 Claims, 4 Drawing Sheets

U.S. PATENT DOCUMENTS

| | | | |
|---|---|---|---|
| 5,948,277 A * | 9/1999 | Frankenberger | 210/803 |
| 6,096,228 A * | 8/2000 | Angelle | 210/803 |
| 6,340,033 B2 | 1/2002 | Paradis et al. | |
| 6,568,541 B2 * | 5/2003 | Koreis et al. | 210/534 |
| 2005/0042064 A1 | 2/2005 | Kulbeth | |
| 2006/0096935 A1 * | 5/2006 | Harding | 210/803 |

FOREIGN PATENT DOCUMENTS

| | | |
|---|---|---|
| EP | 0019538 A1 | 11/1980 |
| EP | 1 165 202 B1 | 6/2004 |
| JP | 2004/160417 | 6/2004 |
| WO | WO 02/062683 | 8/2002 |

* cited by examiner

APPARATUS FOR PRODUCTION, WITHDRAWAL AND TRANSFER OF HIGHLY VISCOUS SLURRY

This application claims priority to U.S. Provisional Application No. 60/710,455, filed Aug. 23, 2005.

BACKGROUND OF THE INVENTION

1. Field of the Invention

This invention relates to apparatus capable of producing highly viscous slurries in industrial processes, as well as withdrawing and transferring such slurries once formed. More particularly, the invention relates to the thickening, withdrawal and transfer of slurries that are so viscous that they cannot be removed from a vessel simply by draining or even by conventional pumping techniques.

2. Discussion of Prior Art

The present invention is described in the following with particular reference to the treatment of "red mud" which is an aqueous mineral slurry produced during the extraction of alumina from bauxite by the Bayer process. However, such description is just by way of illustration and the present invention may be used to thicken, withdraw and transfer slurries and muds of various kinds, particularly, although not exclusively, those having clay-sized particles and yield pseudoplastic properties produced by any industrial process. It should also be noted that, in the following description, the term "mud" is used to mean the same as "slurry".

During operation of the Bayer process, there are various stages in which red mud is introduced into a vessel and treated for a variety of procedures, such as clarification, washing and thickening of the mud. During such procedures, the mud thickens (i.e. the slurry is separated in a higher solids content fraction) towards the bottom of the vessel to form a thickened bed below a clarified liquor, and the mud is normally displaced or "activated" within the bed by means of a rotating rake or set of arms. Such activation can further increase the thickening of the mud at the lower end of the vessel so that, at the very bottom of the vessel, a highly viscous mud can be formed that is extremely difficult to remove from the vessel on a continuous or intermittent basis. In some parts of the vessel, the thick and highly viscous bed of mud may become stagnant or inactive, making it even more viscous and difficult to extract.

The treatment of red mud in this way is shown, for example, in U.S. Pat. No. 4,830,507 which was issued on May 16, 1989 to Peter F. Bagatto, et al. and is assigned to Alcan International Limited, and also in U.S. Pat. No. 5,080,803 which was issued on Jan. 14, 1992 to Peter F. Bagatto et al. and is assigned to the same assignee.

It has also been observed that when a highly viscous bed of mud forms towards the lower end of the vessel and this mud is being extracted from or near the bottom section of the vessel using a suction pump or similar device, a preferential path of lower viscosity mud (or diluted mud from an upper section) tends to form within the highly viscous bed of mud, leaving higher solids concentration mud un-extracted and stagnant. The phenomenon is informally called "rat-holing" or "doughnut formation" and is undesirable.

The consequence of this situation is that, although some gravity settling vessels can produce highly viscous mud, the resulting mud of high solids content becomes partly diluted by the creation of a preferential path of extraction, so that what is actually extracted is a more dilute mud. This dilution phenomenon induces instability with respect to the concentration and viscosity of the mud being extracted from that vessel and hence introduces severe control difficulties.

The problem of removing highly viscous slurries or muds from vessels of this kind is specifically addressed in U.S. Pat. No. 6,340,033 which was issued on Jan. 22, 2002 to Ronald Paradis et al. and is assigned to Alcan International Limited. The solution to the problem described in this patent involves using a pump or impeller to withdraw slurry from a vessel, subjecting it to high shear, and returning it to the vessel at a point somewhat displaced from the point of slurry withdrawal. The high shear applied to the slurry reduces the viscosity of the slurry (which is referred to as shear-thinning) and thus creates a supply of mud of reduced viscosity. The mud of reduced viscosity, upon re-entry into the vessel, creates a stream of mud within the vessel that entraps particles or clumps of slurry of higher viscosity that are thereby removed from the vessel, recirculated and themselves reduced in viscosity. During the recirculation process, some of the slurry of reduced viscosity is removed and transferred to a different location, thereby continuously withdrawing mud from the system.

While this is an effective solution to the problem of removing slurry of high viscosity from a vessel, it has the disadvantage that the slurry thus removed is necessarily of somewhat reduced viscosity and has to be allowed to settle and stand if a higher viscosity material is required. In many instances, higher viscosity slurry is desirable because it has many of the properties of a solid. Thus, it is at least partially self-supporting when dumped at a land-fill site or other location and can therefore be stacked at a greater height than slurry of low viscosity which tends to flow and dissipate when dumped. Slurry of high viscosity can also be transported on an open conveyor belt, an open truck, or the like, and there is always the option of subjecting it to high shear by means of a pump or impeller, when desired, so that it can be pumped through pipes to another location. Moreover, U.S. Pat. No. 6,340,033 does not fully address the "rat-holing" issue discussed earlier when the mud becomes very thick.

European Patent Publication EP 0 019 538 A1 issued in the name of Alsthom-Atlantique SA, uses a spiral-shaped element to assist the removal of slurry from a tank. The spiral-shaped element is positioned below the tank and acts to remove slurry exiting the interior of the tank through a narrow central opening. The element is largely confined within a closely-surrounding tube or cylinder and only its distal end is aligned with the central opening of the tank. Such an arrangement is likely to be of little use for removing slurry of very high viscosity because such slurry would not flow easily through the narrow central opening provided in the bottom wall of the tank.

Accordingly, it would be advantageous to provide equipment that can generate, on a consistent basis, a highly viscous mud having a high solids concentration, minimizing any internal dilution due to preferential path within the thick mud bed, and without substantially varying the viscosity of the slurry during the removal process.

SUMMARY OF THE INVENTION

In exemplary embodiments of the present invention, thickened slurry of high solids content produced from a slurry introduced into a vessel acting as a gravity settler is removed from the vessel by a procedure in which a portion of the slurry of high solids content is physically engaged by a removal element located permanently or temporarily within the interior of the vessel (i.e. the part of the vessel where the thickened slurry of high solids content is initially formed) and is transported by the element through an outlet provided for the slurry of high solids content. Reliance on gravity draining through the outlet and the use of suction pumps, impellers, and the like to remove the slurry of high solids content from the vessel can thereby be avoided in whole or in part, and any tendency of the slurry of high solids content to bind or bridge at the outlet is overcome.

By the term "physically engaged" we mean that one or more parts of the removal element contact the portion of thickened slurry of high solids content within the interior of the vessel in such a way that the portion is moved in the vessel upon operation of the element (e.g. by rotation or translation) towards and through the outlet without applying undue shear to the thickened slurry.

Certain exemplary embodiments can provide an improvement to gravity settler design comprising a slurry vessel in which at least a component of a slurry of high solids content accumulates at the lower end of the vessel without any significant internal dilution, and a slurry withdrawal apparatus for removal of the slurry of high solids content from the vessel. The slurry withdrawal apparatus may comprise an elongated, rotatable, open-spiral-shaped element extending, at least intermittently, for a distance into the interior of the settler vessel from the outside at the lower end of the vessel, the open-spiral-shaped element being in direct and unconfined communication with the interior of the vessel, at a position where the slurry of high solids contents accumulates, over at least a majority of its length when extending fully into the vessel. The slurry withdrawal apparatus also preferably includes a rotational drive mechanism for rotating the open-spiral-shaped element, at least intermittently.

Other exemplary embodiments provide a method of generating, on a consistent basis, a slurry of very high solids content and of withdrawing the slurry of very high solids content from a vessel. The method comprises introducing into a vessel containing a slurry of very high solids content an elongated open-spiral-shaped element exposed to the slurry over at least a very large section of the length thereof, the spiral-shaped element being introduced through a wall of the vessel near the bottom, and operating the spiral-shaped element to withdraw the slurry from the vessel.

The invention may be used with mineral slurries, especially red mud from bauxite extraction, as well as with slurries of other kinds. Certain embodiments of the invention can be also used with slurries or muds having high sand content (i.e. particles larger than usual for slurries by an order of magnitude at least) without encountering difficulties.

By the term "open-spiral-shaped element" we mean to include any kind of elongated element having a longitudinal axis that is preferably straight and this is made up of one or more components having vanes, flutes or constituent parts that create a helical path for slurry to follow and translate from one end to another as the element rotates, or that allow the element to bore into the slurry with minimal slurry displacement, as the element is rotated and inserted into a body of the slurry. Generally, when the spiral-shaped element has vanes, the vanes are orientated at an angle (e.g. at right angles) to the line of motion, and have uniform spacing (pitch). Such an element is described as "open" when the helical path, i.e. the spaces between the vanes, flutes or constituent parts, are open to the exterior of the element (the interior of the vessel) so that mud or slurry can enter along an exposed length of the element. The element is exposed, unshielded, unconfined or not blocked by any other member, at least over a majority of the length of the member and at least from one side (region of the circumference). This allows unconfined and unrestricted access of the slurry to the helical path defined by the element at least along the majority of its length (more than 50%) within the vessel and preferably along its entire length within the vessel. The slurry preferably has access to the open-spiral-shaped element such that, as slurry is withdrawn from the vessel, more slurry may descend around the element solely under the effects of gravity and any suction developed by the slurry withdrawal. The access to the element in this way should not encounter any constriction or choke points that cause bridging or blocking of the slurry flow as it advances into contact with the element. The slurry should therefore not be caused to pass through narrow openings before reaching the element from the interior of the vessel. Slurry of high viscosity will normally flow under the effects of gravity if there are no confining surfaces or articles to restrict the downward flow.

Preferably, in certain embodiments, the open-spiral-shaped element extends into the vessel (which is normally cylindrical) horizontally along a radius of the vessel through an opening in a sidewall of the vessel, but this is not essential. For example, the element may be displaced from, but arranged parallel to, a central diametrical line of the vessel. The opening through which the element enters the vessel may be provided in the side wall or a sloping part of the lower wall of the vessel and preferably has a generally horizontal orientation. The vessel is therefore not normally provided with a central vertically-disposed opening or drain as has been conventional in settlers of this kind. Essentially, the open-spiral-shaped element enters the vessel interior at the height of the slurry layer of high solids content and mechanically withdraws the slurry from the vessel without first requiring the slurry to pass through a restricted slurry outlet or an inlet of a conventional pump.

DETAILED DESCRIPTION OF THE PREFERRED EMBODIMENTS

Figure 1:
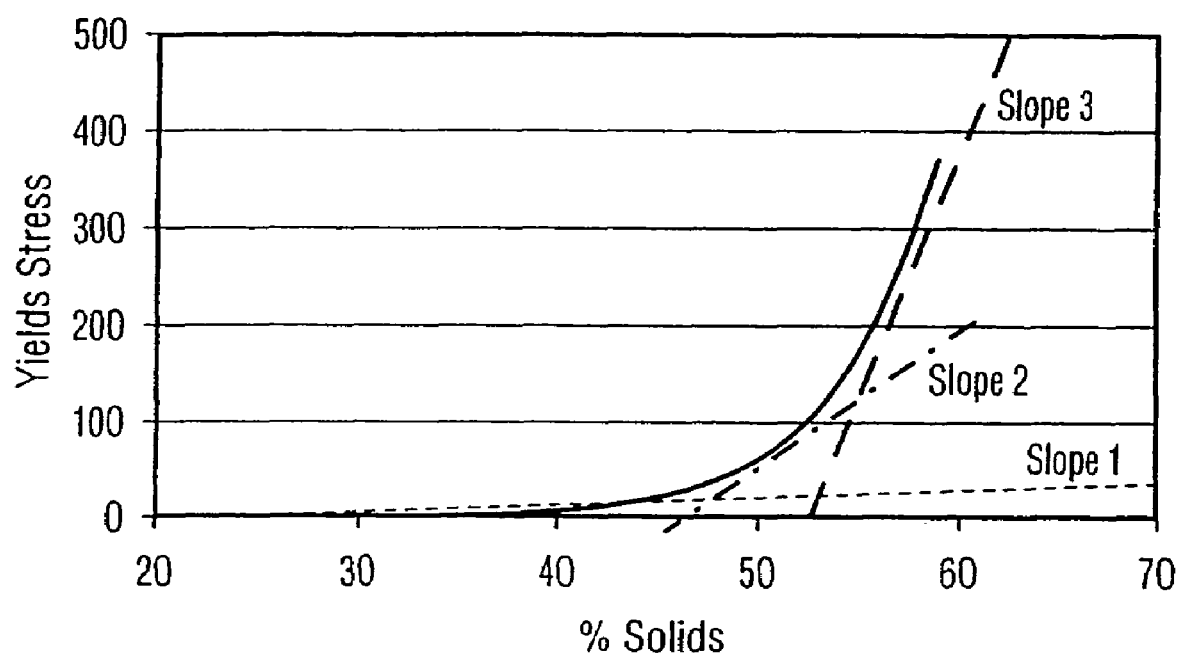
FIG. 1 is a graph showing the yield stress of a particular slurry plotted against the solids content of the slurry to illustrate different kinds of slurry that can be obtained.

To facilitate an understanding of the present invention, it may first be useful to describe the types of slurry with which the present invention may be employed. In order to describe the rheological properties of slurries, a graph similar to the one shown in FIG. 1 is often employed. This is a graph of yield stress versus the percentage of solids in a particular slurry (in this case, a "red mud" produced during the extraction of alumina from a given bauxite ore body). Other red muds or other mineral slurries will have different yield stress values at various solids contents, but most will have a curve of similar shape.

As can be seen from the graph, the yield stress of the slurry has only a very low value at a solids content of less than 40%.

Figure 2A:
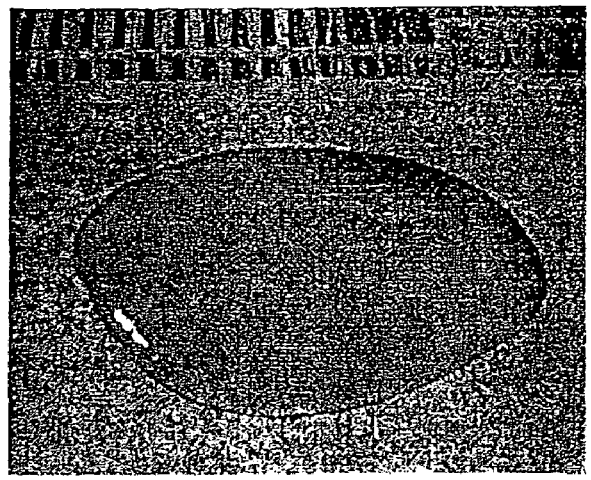
FIG. 2A, FIG. 2B and FIG. 2C are each photographs of slurry extracted from settling apparatus, the slurries being of different yield stress values and solids content.

For slurries with higher solids content, the yield stress increases gradually at first (Slope 1 in the figure—a slope of approximately 1 or less). Slurries of this kind are referred to as "dilute slurries" and an example of such slurries is the mud obtained from a conventional wide and flat bottom thickener. An illustration of such slurries is shown in FIG. 2A and it will be seen that, upon being left unsupported on a flat surface, the slurry immediately flattens into a pool. For slurries of this kind, the slump or slump ratio is in the order of 0.1 or less. In this regard, it should be noted that viscosities of slurries and muds are often assessed by carrying out slump tests in which the mud is packed into a standard cylinder having an open bottom and top resting on a support surface. The cylinder is then removed upwardly and the height and width of the remaining pile are measured after a given time. The unsupported slurry will slump to some extent. A stiffer or more viscous slurry will slump less than a less viscous slurry and thus will have a greater "slump height" or "slump ratio" (ratio between height and width at the base of the cone).

Figure 2B:

Referring again to FIG. 1, for slurries with solids contents of about 45 to 52%, the slope increases more rapidly (Slope 2 of the figure—a slope ranging from about 10 to 20). This corresponds to slurries referred to as "paste slurries" and an illustration of such a slurry is shown in FIG. 2B. This slurry was obtained from a deep thickener, e.g. as described in U.S. Pat. No. 4,830,507. The slump ratio is approximately between 0.2 and 0.5 and it can be seen that there is a considerable spread at the base.

Figure 2C:

The slope of the curve of FIG. 1 starts to increase dramatically from about 52% solids onwards (Slope 3 of the figure— a slope essentially above 20). This region corresponds to slurries referred to as "solid pastes." An illustration of such a slurry is shown in FIG. 2C which is a solid paste extracted from a thickener in accordance with the present invention. The slump ratio of this sample is approximately 1.25 (any ratio above about 0.5 is considered to indicate a solid paste).

Dilute slurries do not require any specialized means of extraction and transfer easily from thickeners or other vessels. A normal centrifugal pump is sufficient for such transfer. Paste slurry may require the use of specialized equipment and techniques, e.g. as disclosed in U.S. Pat. No. 6,340,033. On the other hand, solid pastes cannot be removed from a thickener using a suction pump and certainly will not flow from an outlet on their own merely under gravity. The present invention is intended most preferably for use with both paste slurries and solid pastes, but especially with the latter.

Figure 3:
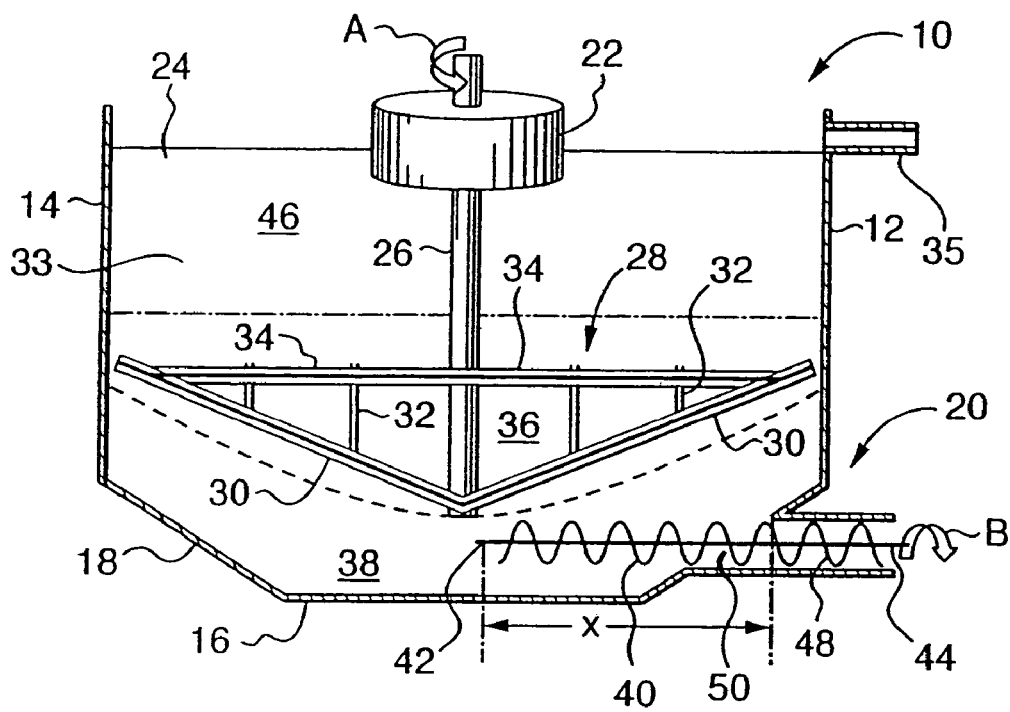
FIG. 3 is a simplified cross-section of a slurry treatment vessel provided with slurry withdrawal apparatus according to one embodiment of the present invention.

FIG. 3 of the accompanying drawings shows, in simplified form, an apparatus 10 used for treating red mud slurry during operation of the Bayer process, e.g. for washing and thickening of the red mud by gravity settling.

The apparatus 10 includes a settler vessel 12 in the form of an open-topped tank having a side wall 14 and a flat bottom wall 16. The side wall 14 includes a tapering section 18 at the lower end 20 of the vessel. The apparatus includes a feed well 22 through which slurry is introduced into the vessel with minimal disturbance of the volume of liquid 24 already present in the vessel. The feed well surrounds a central vertical shaft 26 of a raking device 28 (stirrer) which is rotated about its central vertical axis in the direction of arrow A as shown in the figure. The raking device 28 includes upwardly sloping arms 30 arranged in a V-shape and upright stirrer elements 32 supported by a horizontal arm 34. As the solid particles of the mud settle by gravity towards the bottom of the vessel, water is squeezed from between the solid particles with the assistance of the raking device 28, and the mud acquires a greater solids content and a higher viscosity as it approaches the bottom of the vessel. The water expelled from the solid particles forms a clarified liquid 33 that exits the vessel via an upper outlet 35.

In a raked region 36, the viscosity of the mud is reduced by virtue of the shear-thinning properties of this kind of mud, but beneath the margins of the raking device 28, a region 38 or bed of thickened and unraked mud of high solids content and high viscosity tends to form and build up (as indicated by the dashed line). The viscosity of the thickened mud can be extremely high, for example it may have an initial yield stress of 30 Pa or more, and more probably 50 Pa or more, generally 500 Pa or more, normally 1000 Pa or more, or even 3000 Pa or more.

It is to be noted that the term "initial yield stress" in this context means the minimum force per unit area required to initiate the movement or displacement of a given slurry from the state of rest. It is a measurement used in the industry as an indication of the viscosity of the mud, but it is not a true measure of viscosity itself. The viscosity of a pseudo-plastic material varies with the applied shear caused by mixing or turbulence.

The thickened red mud produced in the illustrated apparatus may have a solids content of more than 56 weight percent, and normally more than 57 weight percent, for example 57.9 weight percent solids or more. Red mud of this consistency cannot be removed by gravity, for example by providing a conventional outlet at the central point of the bottom of the vessel and allowing the mud to drain out. It is even difficult or impossible to remove mud of this consistency by means of a suction pump or impeller, even when resort is made to the invention of U.S. Pat. No. 6,340,033 mentioned above. Mud of this consistency is solid paste of the type described above.

In the illustrated apparatus, the mud of high solids content and viscosity in unraked region 38 is removed by means of an elongated, rotatable, open-spiral-shaped element 40 extending into the vessel from the outside through an opening 50 in the tapered region 18 of the side wall 14 at the lower end 20 of the vessel. The element 40 preferably extends into the tank by a distance x such that the free (distal) end 42 of the element 40 is positioned directly beneath the shaft 26 at the center of the vessel 12. The slurry of high viscosity enters between spiral vanes 48 of the element 40 and is removed from the vessel 12 through opening 50 (which accordingly acts as a slurry outlet) by rotation of the element 40 around its longitudinal axis 44 in the direction of arrow B as shown in FIG. 3. The element consequently physically engages portions of the slurry of high viscosity in the interior of the vessel and withdraws them from the vessel through the restricted outlet 50.

The element 40 as shown is in the form of an Archimedes screw, i.e. a solid longitudinal shaft having one or more encircling spiral vanes, but it could be a spiral element of another form, e.g. an element lacking a central shaft (as if produced by twisting a flat strip or a rod having a propeller-like cross-section) around its longitudinal axis. It is to be noticed that the outer surface of element 40 is positioned within, and is completely open to and in direct communication with, the interior 46 of vessel 12 at the height of the region 38, so that its spiral coils or vanes 48 are exposed to and in contact with the mud of high viscosity along the full length x of insertion of the element into the vessel. The element 40 is essentially completely buried within the mud preferably without contact with the mud of reduced viscosity in the stirred region 36. The spaces between the vanes are unconfined (i.e. they are not obstructed, shielded or covered by other parts of the apparatus) and are hence open to the interior of the vessel and may be directly loaded with slurry at all points where contact with the slurry is made.

It has been found that, when employing such an arrangement within a body of a slurry material of high viscosity and density (particularly a slurry paste or solid paste), the slurry surrounding the element 40 appears to confine slurry positioned between the vanes 48 thus causing the slurry to remain in contact with the element, and causes the material to be conveyed longitudinally. This ensures that the material passes through opening 50 in the side wall of the vessel as the element is rotated, and preferably into an external chamber or tube (not shown in FIG. 3) from which it can be transferred away from the apparatus. As slurry is removed in this way, more slurry is forced between the vanes 48 of the element 40 by virtue of the weight and pressure of the surrounding slurry. In effect, slurry confined between the vanes is constrained to move axially with the rotating element 40, while more slurry enters between the vanes to replace the slurry withdrawn from the vessel.

Even though there may be some localized shear force applied to the slurry material as it is acted on by the element 40 (e.g. in a thin layer where the mud contacts the material of the vanes), this does not produce a dramatic or unacceptable reduction of the overall viscosity of the slurry material as it is removed from the vessel. Without wishing to be bound by theory, some degree of shear-thinning may be helpful to act as a lubricant between the slurry and the vanes (thereby allowing longitudinal movement of the slurry trapped between the vanes rather than mere rotation in concert with the element). However, it is desirable to rotate the element 40 fairly slowly to avoid substantial shear-thinning of the slurry and to avoid undue compression or further de-watering of the slurry. The actual rotational speed considered desirable in a particular case depends on the size and pitch of the vanes 48, as well as the nature of the slurry. Normally, it is desirable not to rotate the element 40 at more than 130 rpm. The flow rate of the slurry is usually linear with the rotational speed of the element 40, provided any outlet tube attached to the opening 50 has essentially the same diameter as the element 40.

While the element 40 employed in FIG. 3 is of constant diameter along its full length, the element may (if desired) be tapered inwardly towards the free end 42 to ensure a uniform rate of extraction along the full length of the element.

It should also be noted that more than one extraction point can be provided around the vessel 12, each provided with its own spiral-shaped element 40 in order to increase the rate of extraction of the slurry and to minimize the regions in which inactive slurry may build up. Such extraction points may be arranged at 90° to each other or arranged at other angles to best suit the design of the raking device 28 that pushes the material towards the extraction points. Further, the (or each) element may be positioned off-radius if desired.

The illustrated embodiment thus employs a spiral-shaped element that is fully exposed to the interior of the tank (i.e. is unconfined) at least along a substantial portion of its length (e.g. at least 20% or at least 25% of its length). More preferably, the element is fully exposed to the interior of the tank for at least a majority (50% or more) of the distance x between the free end 42 of the element 40 and the vessel wall 18, and even more preferably at least (in increasing order of preference) 55, 60, 65, 70, 75, 80, 85, 90, 95%, and most desirably 100% of the distance x. Thus, ideally, the spiral-shaped element is fully exposed to the interior of the vessel along its full length.

As already noted, in the embodiment shown in FIG. 3, the spiral-shaped element 40 is open to the interior of the vessel (and hence to the slurry material of high viscosity) from all sides of the element (i.e. the entire 360 degrees of the circumference of the spiral-shaped element is directly exposed to, and positioned within, the interior of the vessel). However, as will be apparent from additional embodiments described below, it is only necessary to expose one side (e.g. an elongated strip preferably on the upper side) of the circumference of the spiral-shaped element to the interior of the vessel for the apparatus to be effective, for example by positioning the element within an open-topped trough of rectangular plan view formed in the bottom wall of the vessel. However, the lateral width of the trough (the open top) must preferably be wide enough to allow the slurry of high viscosity to enter the trough without significant restriction or confinement and be withdrawn by the spiral-shaped element. Such an arrangement is shown in more detail in FIG. 4.

Figure 4:
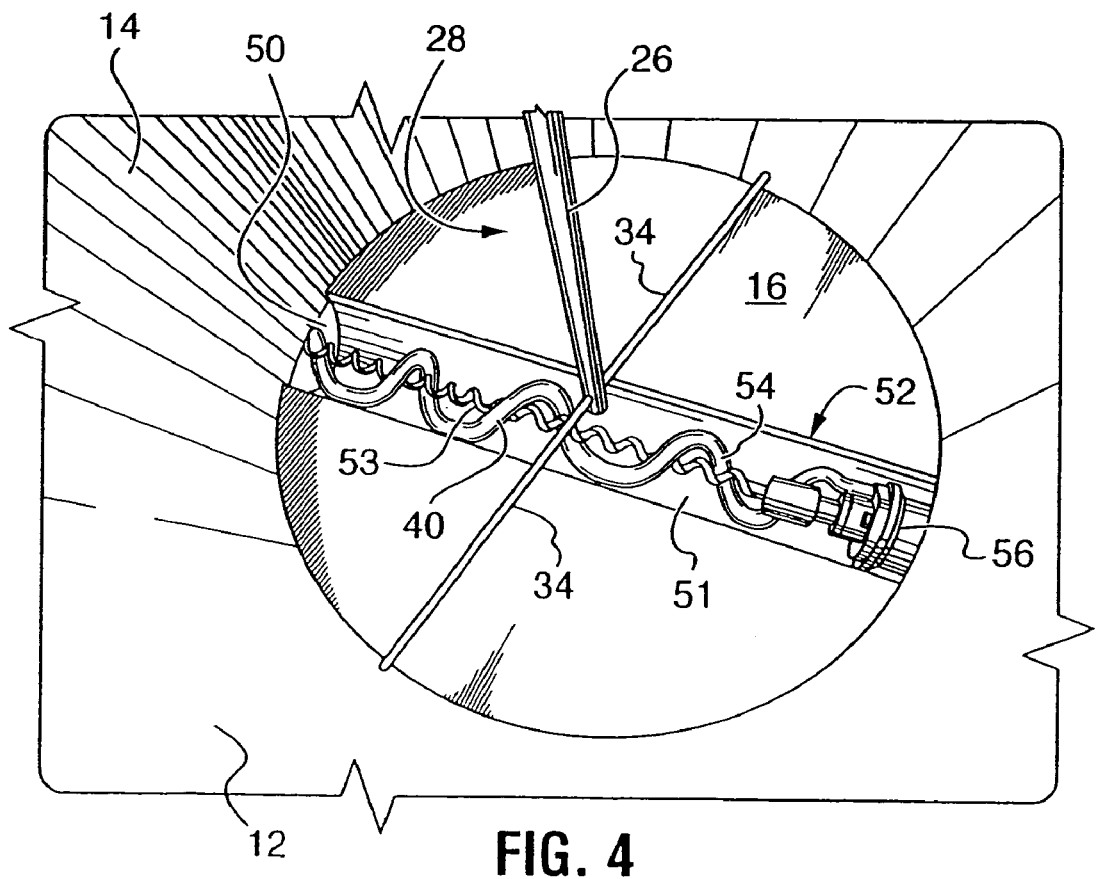
FIG. 4 is a perspective view of an interior of a vessel similar to that of FIG. 3, but having a trough in the bottom wall of the vessel housing a spiral-shaped slurry withdrawal element.

FIG. 4 shows the interior of a vessel 12 having a side wall 14 and a bottom wall 16 similar to that of FIG. 3, except that, in the embodiment of FIG. 4, the side wall 14 does not taper inwardly towards the bottom wall 16 which is flat and horizontal. As in the previous embodiment, the vessel is provided with raking apparatus 28 including a vertical shaft 26 and stirrer arms 34 (which are horizontal in this embodiment).

The bottom wall 16 has a diametrically-arranged trough 52 extending completely between opposite parts of the side wall of the vessel. The trough 52 has an open top 51 and contains an open-spiral-shaped element 40 extending the full length of the trough 52. In this embodiment, the spiral-shaped element includes two coaxial and co-extensive, mutually telescoped, corkscrew-shaped spiral members 53 and 54 of different diameters. Both these members are of the open spiral type having an open axial core (corkscrew type). The smaller-diameter member 53 extends through and along the core of the larger-diameter member 54, as shown. A support 56 is connected to a rotational device (not shown) outside the vessel that is capable of rotating the two members 53 and 54 at the same or different rotational speeds in the same or different directions. This design and arrangement is found particularly effective for removing slurry of very high viscosity from the vessel because the larger-diameter member 54 acts as a distribution/homogenization device that may create an acceptable degree of shear-thinning and acts as an arch-breaker. The member moves the slurry to its center as well as along its length. The smaller-diameter member 53 carries out the extraction of the slurry, so the larger-diameter member feeds slurry to the smaller-diameter member. The combined element 40 is particularly effective when the members 53 and 54 are rotated at different speeds in the same direction. Ideally, there is a fixed ratio of rotation between the two members so that if one member is speeded up to increase the rate of slurry extraction, the other member also speeds up to the same extent. When the members 53 and 54 rotate at different speeds, there is little possibility of the screws filling up with slurry and turning as a whole rather than moving longitudinally. Normally, the member of smaller-diameter is rotated at speeds up to about 130 rpm and the member of larger diameter is rotated at speeds of up to about 8 rpm.

The members 53 and 54 are rotated in such a direction as to move the slurry to the left as shown in FIG. 4 where a slurry exit 50 is located. The members thereby cause the slurry to be transferred through the outlet and hence removed from the vessel. In an alternative embodiment, the support 56 may be positioned outside the vessel so that the slurry may be drawn to the right along the channel 52. This has the advantage of avoiding exposure of seals and the like in the support 56 to the full pressure of the slurry in the tank.

As noted, the rectangular top 51 of the trough 52 is wide enough and long enough to allow the slurry of high viscosity to descend into the trough under the effect of gravity and the pressure of the surrounding slurry. There is therefore no choke point or confined outlet to cause the slurry material to bind or bridge at the entrance 51 and, in effect, the trough forms a part of the vessel interior as a layer of the slurry of high viscosity forms directly within the trough. As can be seen, in this embodiment, the entrance 51 to the trough is wider than the width of the larger-diameter member 54. In practice, it is found that the width of the trough 52, and the width of the entrance 51, should be at least equal to the diameter of the largest part of the spiral-shaped element and preferably at least one and half times that diameter. The overall area of the entrance 51 of the trough should preferably be at least (1.5 times the outer diameter of the spiral-shaped element)×(50% of the radius of the vessel at the bottom).

Ideally, the trough 52 has vertical sides, or sides that are steeply inclined (either inwardly or outwardly towards the bottom), to prevent bridging of the slurry descending into the trough. Also, the trough depth should preferably be the same as the diameter of the element 40, or only slightly larger in order to avoid the formation of a zone of inactive slurry beneath the element 40.

By locating the spiral-shaped element 40 in the trough 52 formed in the lower wall 16 of the vessel, stirrer arms 34 may be positioned closer to the bottom wall 16 than in the embodiment of FIG. 3, thereby minimizing the build-up of inactive mud above the lower wall 16 of the vessel and confining it more specifically to the trough 52.

In the above embodiments, slurry of high viscosity is removed from the vessel by the rotational action of the spiral-shaped element 40 which withdraws the slurry from the interior of the vessel between the vanes of the element as the element is caused to rotate in place on a continuous basis.

In an alternative embodiment of the present invention, slurry is withdrawn by first inserting the spiral-shaped element into the vessel while causing it to rotate (so that it "drills into" the slurry of high viscosity without causing substantial displacement) and then physically withdrawing the spiral-shaped element loaded with slurry from the vessel without allowing the element to rotate, so that a plug or cylinder of the slurry of high viscosity positioned between the vanes of the spiral-shaped element is withdrawn from the vessel en masse. This is illustrated in more detail in FIGS. 5 and 6.

Figure 5:
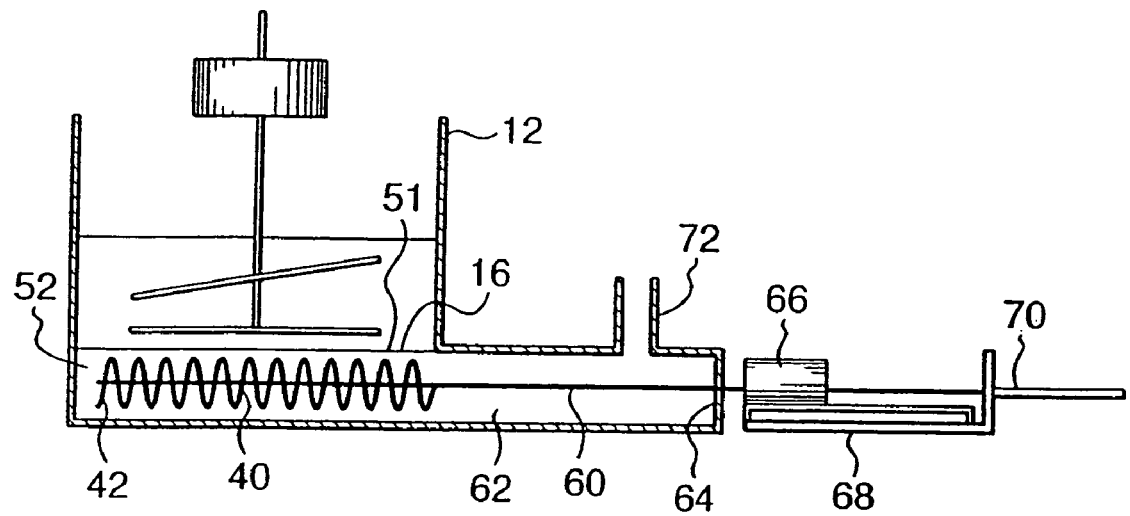
FIG. 5 is a simplified cross-section of a slurry treatment vessel and slurry withdrawal apparatus according to another embodiment of the invention.

In FIG. 5, vessel 12 is similar to that of FIG. 4 as it has a trough 52 positioned beneath and communicating with the bottom wall 16 of the vessel at an entrance 51. The trough 52 contains a spiral-shaped element 40 extending completely across the vessel floor when fully inserted. The spiral-shaped element 40 is attached to a rotatable rod 60 positioned within a withdrawal chamber 62. The rotatable rod 60 extends at its opposite end through an end wall 64 of the withdrawal chamber 62 (via a sliding seal) and is connected to a motor 66 used to intermittently rotate the rotatable rod 60 around its longitudinal axis, which in turn intermittently rotates the spiral-shaped element 40 about its longitudinal axis. The motor 66 is mounted on a track 68 and can be reciprocated back and forth along the track by means of a pneumatic or hydraulic ram 70 or by a mechanical or electrical drive (not shown).

Figure 6:
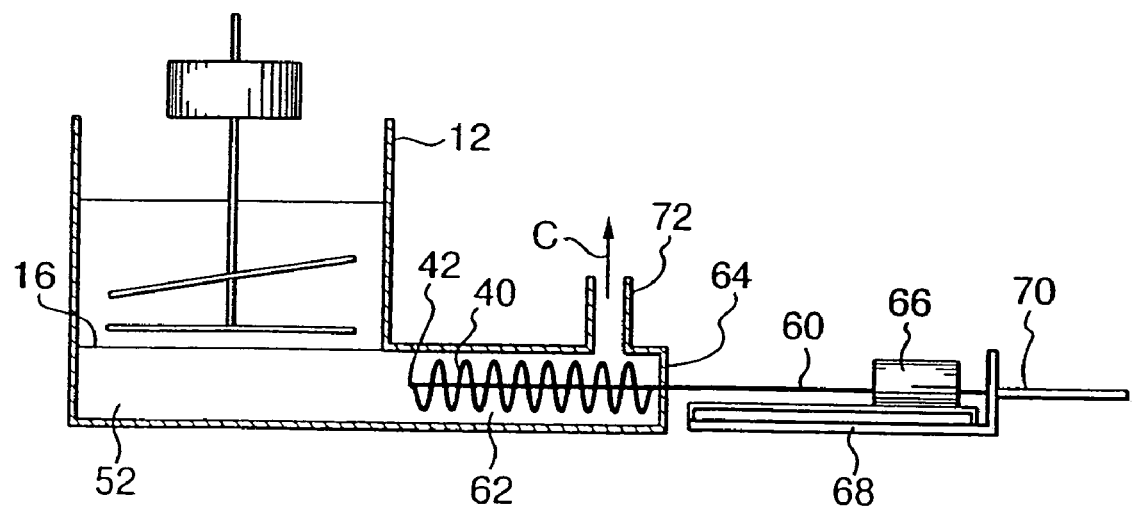
FIG. 6 is a view similar to FIG. 5, but showing another step in the operation of the apparatus.

With the spiral-shaped element 40 in the position shown in FIG. 5 (already drilled into the mud), rotation of the spiral-shaped element is terminated and the ram 70 is operated to withdraw the motor 66 backwardly along the track 68 so that the rod 60 and the spiral-shaped element 40 are moved to the right in the drawing. FIG. 6 shows the same apparatus with the spiral-shaped element moved fully to the right where it is positioned fully within chamber 62. Once in this position, rotation of the rod 60 and spiral-shaped element 40 is commenced and the ram 70 moves the motor 66 forwardly at a rate suitable to allow spiral-shaped element 40 to bury itself within the slurry of high viscosity positioned within the trough 52. Ideally, the rotational speed of the element 40 and the translational speed of insertion are matched to minimize disturbance of the slurry in the vessel and applied shear force. The spiral-shaped element 40 has an exposed tip 42 at its free end that allows the element to burrow into the slurry of high viscosity in the vessel in a manner similar to the operation of a drill or corkscrew. Slurry already between the vanes of the element from a previous operational cycle remains in the chamber 62 as the element drills into fresh slurry in the vessel itself. Once in the position shown in FIG. 5, rotation is terminated as explained above and the cycle is repeated. The movement of the spiral-shaped element to the right in FIG. 5 causes a plug or cylinder of the slurry associated with the spiral-shaped element 40 to be drawn bodily into the chamber 62 and slurry material already in the chamber from a previous operational cycle is forced out of an outlet 72 from the chamber in the direction of arrow C. Ideally, there should be very little free space between the element 40 and the adjacent walls of the chamber 62 so that the element acts like a piston to drive slurry out of the chamber.

It is to be noted that the arrangement shown in FIGS. 5 and 6 involves pulling of the stationary spiral element 40 out of the vessel after insertion with rotation. However, a pushing action could also be employed in the present invention. That is to say, the element 40 may be driven from the left in FIGS. 5 and 6 and pushed into the chamber 62 still positioned on the right hand side. The element is then rotated as it is pulled out of the chamber into the vessel.

In the embodiment of FIGS. 5 and 6 of the present application, it is found that the energy required to introduce the spiral-shaped element 40 into the trough 52 filled with slurry of high viscosity is relatively small because of the screw-like movement of the element as it is introduced causing little displacement of the slurry. This has the advantage of introducing minimum disturbance to the internal structure of the slurry. Then, by pulling the spiral-shaped element out of the vessel without any rotation, but with the power of a ram 70, the slurry maintains its undisturbed internal network structure and hence its original viscosity value. By repeating this cycle several times, the slurry of high viscosity is pushed into pipe 72 and may be transferred to another vessel, a transportation device or directly to a disposal site.

Normally, the apparatus can be operated with up to 30 complete strokes per minute but this may clearly be varied to suit the size and type of equipment, and type of slurry, etc.

It will be appreciated that the open-spiral-shaped element 40 of the present invention, particularly that of the embodiments of FIGS. 5 and 6, should be a screw-like device that can bury itself into a body of material with minimal disruption of the material effected. There are several designs of spiral-shaped element that may accomplish this or even multi-component elements as shown, for example, in FIG. 4.

The apparatus of the present invention is capable of conveying a slurry of high viscosity up to 100 meters or even more from a vessel, particularly in the embodiments of FIGS. 5 and 6.

As noted the apparatus shown in FIGS. 5 and 6 is in simplified form and, in reality, would likely be more complex as will be apparent to a persons skilled in the art. For example, it may be desirable to avoid using the housing of the motor 66 to transmit force from the ram 70 to the rod 60. Instead, the ram 70 may be connected directly to the rod 60 and gear arrangement used to allow the motor to rotate the rod.

In all of the above embodiments, the spiral-shaped element is operated horizontally. This is usual but not essential. For example, in the embodiment of FIG. 3, the spiral-shaped element 40 may be arranged to extend into the vessel 12 parallel to the tapering part 18 of side wall 14, especially if it remains buried in mud of high solids content. It is also conceivable, but not currently preferrable, that the spiral-shaped element could be arranged to extend vertically into the vessel from below through an opening in the bottom wall, provided the element does not penetrate completely through the layer of slurry of high viscosity.

The apparatus of the present invention is usually, although not necessarily, employed with vessels of 8 meters or more (ideally 12 meters or more) in diameter and the length of full insertion of the spiral-shaped element into the vessel is normally at least about one third of the vessel diameter, more preferably half of the vessel diameter, and even the complete vessel diameter (as shown in FIG. 3).

While it is normally desirable to operate the apparatus to avoid changing the viscosity of the slurry by much as it is withdrawn from the vessel, the pitch of the spiral-shaped element (e.g. the number of vanes per unit length) and its speed of rotation may alternatively be chosen to vary the viscosity and speed of delivery of the slurry exiting the apparatus. The motor used to rotate the spiral-shaped element, particularly in the embodiment of FIGS. 3 and 4, may be a variable speed motor so that the speed of rotation can be adjusted by an operator or computer on site to produce a slurry of desired exit viscosity.

The present invention may be employed with slurries having initial yield stress values of at least 30 Pascals (more preferably at least 50 Pascals) and also up to several thousand Pascals. While the slurries with which the present invention is used are generally shear-thinning, this is not essential. For example, muds having a high sand content may not have shear-thinning properties, but may still be used with the present invention. Slurries or pastes from many industrial processes may also be used where feed material is ground to a fine size prior to the extraction or recovery of a desired material, e.g. tailings produced during the extraction of gold, copper, zinc and lead.

The present invention is described in more detail with reference to the following Example which should not be considered as limiting the scope of the invention.

COMPARATIVE EXAMPLE 1

A test was carried out in a deep thickener (12 meters in diameter) of the kind described in U.S. Pat. No. 4,830,507 modified to include a spiral-shaped removal element as shown in FIGS. 5 and 6 of the accompanying drawings. The thickener was also equipped with a conventional centrifugal pump with a recirculation system at the underflow as described in U.S. Pat. No. 6,340,033.

The thickener was fed with a bauxite residue slurry (red mud) at a flow rate of 500-550 m³/h. The slurry had a solids content of 100-150 g/l (dry basis) for a total feed rate of 55 to 60 t/hr.

The slurry was extracted by means the centrifugal pump with recirculation. The results are summarized in Row 1 of Table 1 below:

TABLE 1

Characteristics of Mud at the Underflow of an Industrial thickener

| Row No. | Sampling location | Solids concentration (%) | Initial Yield Stress (Pa) | Comments |
|---|---|---|---|---|
| 1 | Exit of centrifugal pump (with recirculation) | 49.8 | 65 | Thick mud requiring recirculation to be extracted |
| 2 | Exit of screw | 50.0 | 270 | Thick mud requiring recirculation to be extracted |
| 3 | Exit of screw | 51.1 | 475 | Thick mud requiring recirculation to be extracted |
| 4 | Exit of screw | 56.1 | 2900 | Mud too thick to be recirculated |
| 5 | Exit of screw | 56.6 | 4300 | Mud too thick to be recirculated |

EXAMPLE 1

A test was carried out in a pilot deep thickener (0.6 meter in diameter by 1.5 m in height) modified to include a spiral-shaped removal element as shown in FIG. 4.

The thickener was fed via a pump with a bauxite residue slurry (red mud) at a flow rate of 1 L/min. The slurry had a solids content of 100 g/l (dry basis) for a total feed rate of 6 kg/hr.

The slurry was extracted by means of the spiral-shaped removal element. The solids concentration at the underflow was constant at 52.2% with a slump ratio of 0.5.

EXAMPLE 2

The procedure of Comparative Example 1 was repeated, except that the slurry was extracted by the spiral-shaped element. The results are summarized in Row 2 of Table 1. It can be seen that the mud maintains the same solids concentration, but in this case has a much higher yield stress (270 Pa).

The procedure was again repeated with a mud of higher solids content (51.1%), and the measured yield stress is significantly higher (475 Pa). The results are summarized in Row 3 of Table 1.

The slurries obtained in both of these cases are examples of paste slurries (less than 500 Pa) that could also be extracted by the recirculating pump. The difference is that the yield stress of the mud at the outlet of the "screw pump" (i.e. the pump in accordance with the invention) is about four times higher than the yield stress of the "equivalent" mud coming out of a conventional centrifugal pump.

EXAMPLE 3

The procedure of Comparative Example 1 was again repeated with slurries of even higher solids content (56.1 and 56.6%), and slurries of extremely high yield stress were obtained (2900 and 4300 Pa). The results are summarized in Rows 4 and 5 of Table 1. These slurries are examples of solid pastes and they could not be extracted by any other means than the spiral shaped element.

The invention claimed is:

1. Apparatus for separating components of slurries by gravity settling thereby forming a thickened slurry and a clarified liquid, comprising a vessel for decanting a volume of slurry, said vessel having a top and an interior formed by a side wall and a bottom wall for holding said slurry, a slurry inlet, an outlet for the clarified liquid near the top of the vessel, a raking device extending into said interior of said vessel and operable to form a raked region within said vessel where said thickened slurry is formed, and a slurry withdrawal apparatus beneath said raked region for removal of said thickened slurry from the vessel at or near the bottom wall thereof; said slurry withdrawal apparatus comprising an elongated, rotatable, open-spiral-shaped element extending or extendable for a distance into said vessel through an opening near the bottom wall of the vessel, said open spiral-shaped element being in direct and unconfined communication with said interior of the vessel over a majority of said distance when said element is fully extending into said interior of said vessel, and a drive mechanism for said open-spiral-shaped element for operating said element to withdraw thickened slurry from the vessel.

2. The apparatus of claim 1, wherein said open-spiral-shaped element extends for said distance into the vessel on a permanent basis, and said drive mechanism rotates said element about a longitudinal axis to withdraw thickened slurry from the vessel.

3. The apparatus of claim 1, wherein said bottom wall of said vessel is flat and said open-spiral-shaped element extends generally horizontally directly above said bottom wall of said vessel when extending therein.

4. The apparatus of claim 1, wherein said open-spiral-shaped element extends from said side wall at least to a center of said bottom wall of the vessel when extending for said distance therein.

5. The apparatus of claim 1, wherein said bottom wall of the vessel has an open-top, downwardly projecting trough formed therein extending inwardly of the vessel from said side wall, and wherein said open-spiral-shaped element occupies said trough when extending into said vessel.

6. The apparatus of claim 5, wherein said open-top of said trough has an area effective to allow said thickened slurry to descend into said trough under gravity.

7. The apparatus of claim 6, wherein said area corresponding to at least (1.5 times an outer diameter of the open-spiral-shaped element)×(50% of a radius of the vessel at said bottom wall).

8. The apparatus of claim 1, including a tube connected to said opening externally of the vessel for receiving thickened slurry withdrawn from the vessel by said open-spiral-shaped element and for conveying said slurry to a desired location.

9. The apparatus of claim 1, wherein said open-spiral-shaped element comprises two nesting co-axial corkscrew-shaped spiral members of different diameters.

10. The apparatus of claim 1 configured to produce said thickened slurry in the form of a paste slurry.

11. The apparatus of claim 1 configured to produce said thickened slurry in the form of a solid paste.

12. Apparatus for separating components of slurries by gravity settling thereby forming a thickened slurry and a clarified liquid, comprising a vessel for decanting a volume of slurry, said vessel having a top and an interior formed by a side wall and a bottom wall for holding said slurry, a slurry inlet, an outlet for the clarified liguid near the top of the vessel, and a slurry withdrawal apparatus for removal of said thickened slurry from the vessel at or near the bottom wall thereof; said slurry withdrawal apparatus comprising an elongated, rotatable, open-spiral-shaped element extending or extendable for a distance into said vessel throuah an opening near the bottom wall of the vessel, said open spiral-shaped element being in direct and unconfined communication with said interior of the vessel over a part of said distance when said element is fully extending into said vessel, and a drive mechanism for said open-spiral-shaped element for operating said element to withdraw thickened slurry from the vessel, and wherein said open-spiral-shaped element is insertable into and removable from said vessel through said opening, and wherein said drive mechanism intermittently rotates said element about a longitudinal axis, and also reciprocates said element back and forth along said axis into and out of said vessel.

13. The apparatus of claim 12, wherein drive mechanism is positioned outside said vessel and includes a rotational motor mounted on a slide, and an apparatus for moving said motor back and forth on said slid.

14. The apparatus of claim 12, wherein said drive mechanism induces controls to rotate said open-spiral-shaped element as said mechanism extends said element into said vessel, and to cease said rotation as said mechanism withdraws said element from said vessel.

15. The apparatus of claim 14, wherein said drive mechanism includes controls to coordinate speeds of rotation and translation of said element as said element is extended into said vessel to cause minimal disturbance of thickened slurry in said vessel.

16. Apparatus for separating components of slurries by gravity settling thereby forming a thickened slurry in the form of a paste slurry or a solid paste and a clarified liquid, comprising a vessel for decanting a volume of slurry, said vessel having a top and an interior formed by a side wall and a bottom wall for holding said slurry, a slurry inlet means, an outlet for the clarified liquid near the top of the vessel, a ranking device extending into said interior of said vessel and operable to form a raked region within said vessel where said thickened slurry is formed, and a slurry withdrawal apparatus beneath said raked region for removal of said thickened slurry from the vessel at or near the bottom wall thereof; said slurry withdrawal apparatus comprising an elongated, rotatable, open-spiral-shaped element extending for a distance directly into said interior of the vessel through an opening near said bottom wall, said open spiral-shaped element being in direct and unconfined communication with said interior of the vessel over a majority of said distance, and drive means for rotating the element about a longitudinal axis thereof in a direction to remove thickened slurry from said vessel through said opening.

17. Apparatus for separating components of slurries by gravity settling thereby forming a thickened slurry in the form of a paste slurry or solid paste and a clarified liquid, said apparatus comprising a vessel for decanting a volume of slurry, said vessel having a top and an interior formed by a side wall and a bottom wall for holding said slurry, a slurry inlet means, an outlet for the clarified liquid near the top of the vessel, and a slurry withdrawal apparatus for removal of said thickened slurry from the vessel at or near the bottom wall thereof; said slurry withdrawal apparatus comprising an elongated, rotatable, open-spiral-shaped element slidably mounted for selective insertion into and withdrawal from the interior of the vessel at or near the bottom wall, means for slidably moving said element into and out of the interior of the vessel, and means for rotating said element at least when said means for slidably moving the element moves said element into said interior of the vessel.

18. A method of processing a paste slurry or a solid paste comprising the steps of:
   introducing a slurry into a vessel;
   moving a raking device through said slurry causing said slurry to separate into a paste slurry or solid paste at a bottom of said vessel and a clarified liquid at the top to said vessel;

introducing an elongated open-spiral-shaped element into the vessel in open and unconfined exposure to said paste slurry or said solid paste over at least a majority of the length of the element, said spiral-shaped element being introduced through an outlet in a wall of the vessel, and operating said spiral-shaped element to withdraw said paste slurry or said solid paste from said vessel through said outlet.

19. The method of claim 18, wherein said open-spiral-shaped element is rotated in place to remove said slurry from said vessel.

20. A method of withdrawing a slurry of high solids content from a vessel, which comprises introducing into a vessel containing a slurry of high solids content an elongated open-spiral-shaped element in open and unconfined exposure to said slurry over at least a part of the length of the element, said spiral-shaped element being introduced through an outlet in a wall of the vessel, and operating said spiral-shaped element to withdraw said slurry from said vessel through said outlet, wherein said open-spiral-shaped element is reciprocated longitudinally into and out of said vessel to remove said slurry, and wherein movement of said spiral-shaped element into said vessel is accompanied by rotation of said element to cause said element to drill into said slurry, and wherein said spiral-shaped element is fixed against rotation when said element is moved out of said vessel.

21. The method of claim 20, wherein said open-spiral-shaped element enters a chamber when moved out of said vessel and slurry withdrawn from the vessel by said element is left behind in said chamber when said element is again moved into said vessel.

22. Apparatus for separating components of a slurry by gravity settling, comprising:

a vessel having an interior in which separation of said slurry takes place to form a thickened slurry at a bottom of said vessel and a clarified liquid at a top of said vessel, said vessel having an outlet for said clarified liquid near said top of said vessel and an outlet for said thickened slurry at or near said bottom of said vessel;

a raking device extending into said interior of said vessel and operable to form a raked region within said vessel above said outlet for thickened slurry where said thickened slurry is formed;

an elongated, rotatable, open-spiral-shaped element extending permanently or intermittently for a distance in said interior of said vessel, said element being in direct and unconfined communication with said interior of the vessel over a majority of said distance when said element extends fully into said interior of said vessel, and said element being operable to engage physically with a portion of said thickened slurry in said interior of said vessel and to transport said portion of said thickened slurry through said outlet of said vessel.

23. A method of separating components of a slurry, which comprises:

introducing a slurry into an interior of a vessel;

moving a raking device through said slurry causing said slurry to separate into a paste slurry or solid paste at a bottom of said vessel and a clarified liquid at a top of said vessel;

withdrawing said clarified liquid from a clarified liquid outlet said vessel near said top of the vessel;

providing an elongated, rotatable, open-spiral-shaped element within said vessel and extending through an outlet at or near said bottom of said vessel, said element being in direct and unconfined communication with said interior of the vessel over a majority of its length; and operating said element within said vessel interior to physically engage a portion of said paste slurry or solid paste and to transport said portion through a said outlet.

* * * * *

UNITED STATES PATENT AND TRADEMARK OFFICE
CERTIFICATE OF CORRECTION

PATENT NO. : 7,473,376 B2
APPLICATION NO. : 11/508059
DATED : January 6, 2009
INVENTOR(S) : Guy Peloquin et al.

It is certified that error appears in the above-identified patent and that said Letters Patent is hereby corrected as shown below:

Column 14, Line 12 "slid" should read "slide"

Column 14, Line 30 "ranking" should read "raking"

Signed and Sealed this

Fourteenth Day of April, 2009

JOHN DOLL
*Acting Director of the United States Patent and Trademark Office*